United States Patent
Umeki et al.

(10) Patent No.: US 7,324,127 B2
(45) Date of Patent: Jan. 29, 2008

(54) IMAGE FORMING APPARATUS AND METHOD THEREOF

(75) Inventors: Mamoru Umeki, Hachioji (JP); Masayuki Nakazawa, Hachioji (JP)

(73) Assignee: Konica Minolta & Medical Graphic, Inc., Tokyo (JP)

( * ) Notice: Subject to any disclaimer, the term of this patent is extended or adjusted under 35 U.S.C. 154(b) by 241 days.

(21) Appl. No.: 11/014,513

(22) Filed: Dec. 16, 2004

(65) Prior Publication Data

US 2005/0099488 A1 May 12, 2005

Related U.S. Application Data

(63) Continuation-in-part of application No. 10/915,826, filed on Aug. 11, 2004, now abandoned.

(30) Foreign Application Priority Data

Aug. 25, 2003 (JP) .............. 2003-300172
Aug. 27, 2003 (JP) .............. 2003-303154

(51) Int. Cl.
*B41J 2/315* (2006.01)
(52) U.S. Cl. .................. 347/221; 347/224; 347/112
(58) Field of Classification Search ............... 347/221, 347/224–226, 112–118; 399/15, 50
See application file for complete search history.

(56) References Cited

U.S. PATENT DOCUMENTS 5,198,852 A * 3/1993 Mikami ................... 399/30
5,461,462 A * 10/1995 Nakane et al. ........... 399/15

FOREIGN PATENT DOCUMENTS

WO 9616507 5/1996

* cited by examiner

*Primary Examiner*—Lam Son Nguyen
(74) *Attorney, Agent, or Firm*—Lucas & Mercanti, LLP (57) ABSTRACT

An image forming apparatus for recording an image on a recording medium according to an inputted diagnostic image signal, including: a recording medium loading section capable of loading plural types of recording media; an exposing device for forming latent images by exposing with predetermined plural test exposure values; a developing device to form developed images on the recording medium; a density measuring device for measuring densities of the developed images; a memory device for storing predetermined density values correlated to the predetermined plural test exposure values; a selecting device for selecting a predetermined number of images among the developed images; and a calibration section for creating LUT that determines a relationship between exposure values and input image signals, based on measured densities of the selected predetermined number of images and stored predetermined density values correlated to the test exposure values.

5 Claims, 6 Drawing Sheets

IMAGE FORMING APPARATUS AND METHOD THEREOF

CROSS REFERENCE TO RELATED APPLICATIONS

This is a continuation-in-part of U.S. patent application Ser. No. 10/915,826, filed Aug. 11, 2004, now abandoned, the priority of which is claimed and the same being incorporated herein by references along with the Japanese priority applications.

BACKGROUND OF THE INVENTION

This invention relates to an image forming apparatus for forming images on a recording medium according to an input image signal and a method thereof. More particularly, the present invention relates to an image forming apparatus that calibrates according to density range of a recording medium and a method thereof.

Generally, for diagnosis of medical images obtained by computed radiography (CR), flat panel detector (FPD), computed tomography (CT), and magnetic resonance imaging (MRI) apparatus, a method has been frequently used comprising recording the medical images on transparency or reflection recording media and observing them as hardcopies. A widely used image forming apparatus employs a method of recording an image on a transparency recording medium made of silver halide recording material by exposure to laser light. This method can reproduce monochromatic multi-tone images with an excellent gradation characteristic on transparency media through which operators can diagnose medical images at high accuracy. Further, as an image forming apparatus for forming medical images on recording media, there are an image forming apparatus using a silver halide recording material that requires a conventional wet process, a dry-type image forming apparatus using photosensitive thermal-development recording material or photosensitive and thermal recording materials, and so on.

To output images of a good gradation characteristic, these image forming apparatus record a wedge pattern image (test pattern image) having wedges of different optical densities on a recording medium by exposure periodically or when a recording medium is loaded, measure the optical densities of the wedges by a contrast meter, and calibrates the relationship between input image signals and laser light exposures by the result of the measurement. For example, Patent Document 1 discloses a technology for automatically correcting dispersion in photosensitive characteristics of films and fluctuation in the developing characteristics.

[Patent Document 1]

Japanese Non-examined Patent Publication HG-233134.

In general, the image forming apparatus uses recording media of different density ranges according to shot objects of medical images. For example, a recording medium used in mammography has a higher maximum density range than a recording medium for general medical images. When an image forming apparatus can load a plurality of recording media of different density ranges, the apparatus is necessary to be calibrated according to the density ranges of the recording media. However, the technology of Patent Document 1 does not disclose any calibration on an image forming apparatus using a plurality of recording media of different density ranges.

An object of this invention is to provide an image forming apparatus that can conduct calibrations according to the density ranges of recording media.

SUMMARY OF THE INVENTION

The above objects can be realized by the invention having following features.

(1) An image forming apparatus for forming and recording an image on a recording medium according to an exposure value corresponding to an inputted diagnostic image signal, the image forming apparatus comprising: a recording medium loading section capable of loading plural types of recording media, each type of recording media having a different density range from the other; an exposing device for forming latent images on the recording medium by exposing the recording medium with predetermined plural test exposure values; a developing device for visualizing the latent images to form developed images on the recording medium; a density measuring device for measuring densities of the developed images corresponding to the predetermined plural test exposure values; a memory device for storing predetermined density values correlated to the predetermined plural test exposure values; a selecting device for selecting a predetermined number of images among the developed images; and a calibration section for creating LUT that determines a relationship between exposure values and input image signals, based on measured densities of the selected predetermined number of images and stored predetermined density values correlated to the predetermined plural test exposure values.

(2) The image forming apparatus of (1), further comprising an input device for inputting information regarding a type of recording medium, wherein the selecting device selects the predetermined number of images based on the information inputted by the input device.

(3) The image forming apparatus of (1), wherein the selecting device identifies a type of the recording medium based on a result of measured densities, and selects the predetermined number of images among the developed images corresponding to the identified type of the recording medium.

(4) The image forming apparatus of (3), wherein the selecting device identifies the type of recording medium by a Dmax value of the measured densities.

(5) An image forming apparatus for forming and recording an image on a recording medium according to an exposure value corresponding to an inputted diagnostic image signal, the image forming apparatus comprising: a recording medium loading section capable of loading plural types of recording media, each type of recording medium having a different density range from the other; a memory device for storing plural test exposure values and predetermined density values correlated to the plural test exposure values; an input device for inputting a type of the recording medium; a selecting device for selecting a predetermined number of exposure values among the plural test exposure values stored in the memory device based on the type of the recording medium inputted by the input device; an exposing device for forming latent images on the recording medium by exposing the recording medium with the predetermined number of test exposure values selected; a developing device for visualizing the latent images to form developed images on the recording medium; a density measuring device for measuring densities of the developed images corresponding to the predetermined number of test exposure values; and a calibration section for creating LUT that determines a relationship between exposure values and input image signals, based on measured densities of the developed images corresponding to the predetermined number of test exposure values and stored predetermined density values correlated to the predetermined number of plural test exposure values.

(6) An image forming method for forming and recording an image on a recording medium according to an exposure value corresponding to an inputted diagnostic image signal, the image forming method comprising the steps of: loading at least one of plural types of recording media, each type of recording media having a different density range from the other; exposing the recording medium with predetermined plural test exposure values to form latent images on the recording medium; developing the latent images to form developed images on the recording medium; measuring densities of the developed images corresponding to the predetermined plural test exposure values; storing predetermined density values correlated to the predetermined plural test exposure values; selecting a predetermined number of images among the developed images corresponding to the predetermined plural test exposure values; and creating a LUT that determines a relationship between input image signals and exposure values, based on measured densities of the selected predetermined number of images and stored predetermined density values correlated to the predetermined plural test exposure values.

(7) An image forming method for forming and recording an image on a recording medium according to an exposure value corresponding to an inputted diagnostic image signal, the image forming method comprising the steps of: loading at least one of plural types of recording media, each type of recording medium having a different density range from the other; storing plural test exposure values and predetermined density values correlated to the plural test exposure values; inputting a type of the recording medium by an input device; selecting a predetermined number of exposure values among the plural test exposure values stored based on the type of the recording medium inputted by the input device; xposing the recording medium with the predetermined number of test exposure values selected to form latent images on the recording medium; developing the latent images to form developed images on the recording medium; measuring densities of the developed images corresponding to the predetermined number of test exposure values; and creating LUT that determines a relationship between input image signals and exposure values, based on measured densities of the developed images corresponding to the predetermined number of test exposure values and stored predetermined density values correlated to the predetermined number of plural test exposure values.

DETAILED DESCRIPTION OF THE PREFERRED EMBODIMENTS

The above objects can also be realized by the invention having the following features.

(11) An image forming apparatus having a recording medium loading section capable of loading two or more types of recording media of different density ranges and functioning to transport the recording media from the recording medium loading section, to form and record images on the recording media by exposure values corresponding to an input diagnostic image signal, wherein the image forming apparatus further comprising: an input device for entering information concerning the type of the recording medium, an exposing device for forming latent images on the recording medium by a plural of preset exposure values, a developing device for making latent images visible on the recording medium, a selecting device for selecting a preset number of images among the developed images according to the information concerning the recording medium type entered from the input device, a density measuring device for measuring the densities of the selected images, a modifying device for calculating a difference between the result of the density measurement and density values preset for exposure values by which the selected preset number of images are formed, and creating values to modify the preset relationship between input image signals and exposure values according to the result of this differential result, and a correcting device for correcting the exposure values corresponding to the input signals by modified values created by the modifying device.

(12) An image forming apparatus having a recording medium loading section capable of loading two or more types of recording media of different density ranges and functioning to transport the recording media from the recording medium loading section, to form and record images on the recording media by exposure values corresponding to an input diagnostic image signal, wherein the image forming apparatus further comprising: an input device for entering information concerning the type of the recording medium, a selecting device for selecting a preset number of exposure values according to the information concerning the recording medium type entered from the input device, an exposing device for forming latent images on the recording medium by a plural of selected exposure values, a developing device for making latent images visible on the recording medium, a density measuring device for measuring the densities of the selected images, a modifying device for calculating a difference between the result of the density measurement and density values preset for exposure values and creating values to modify the preset relationship between input image signals and exposure values according to the result of this differential result, and a correcting device for correcting the exposure values corresponding to the input signals by modified values created by the modifying device.

(13) An image forming apparatus of (11) or (12), wherein the types of recording media contain recording media for mammography.

(14) An image forming method for an image forming apparatus having a recording medium loading section capable of loading two or more types of recording media of different density ranges and functioning to transport the recording media from the recording medium loading section, to form and record images on the recording media by exposure values corresponding to an input diagnostic image signal, wherein the image forming method comprises the steps of: entering information concerning the type of the recording medium, forming latent images on the recording medium by a plural of preset exposure values, making latent images visible on the recording medium, selecting a preset number of images among the developed images according to the information concerning the recording medium type entered from the input device, measuring the densities of the selected images, calculating a difference between the result of the density measurement and density values preset for exposure values by which the selected preset number of images are formed, and creating values to modify the preset relationship between input image signals and exposure values according to the result of this differential result, and correcting the exposure values corresponding to the input signals by modified values created at the modifying step.

(15) An image forming method for an image forming apparatus having a recording medium loading section capable of loading two or more types of recording media of different density ranges and functioning to transport the recording media from the recording medium loading section, to form and record images on the recording media by exposure values corresponding to an input diagnostic image signal, wherein the image forming method comprises the steps of: entering information concerning the type of the recording medium, selecting a plurality of exposure values according to the information concerning the entered recording medium type, forming latent images on the recording medium by a plural of selected exposure values, making latent images visible on the recording medium, measuring the densities of the selected images, calculating a difference between the result of the density measurement and density values preset for exposure values and creating values to modify the preset relationship between input image signals and exposure values according to the result of this differential result, and correcting the exposure values corresponding to the input signals by modified values created by the modifying device.

The invention of (11) or (15) takes the steps of forming latent images on the recording medium by a plurality of preset exposure values, developing for making latent images visible on the recording medium, selecting a preset number of images among the developed images according to the information concerning the entered recording medium type, measuring the densities of the selected images, calculating a difference between the result of the density measurement and density values preset for exposure values by which the selected preset number of images are formed, creating values to modify the preset relationship between input image signals and exposure values according to the result of this differential result, and correcting the entered image signals by the created values for modification. Therefore, according to this invention, calibration can be conducted in accordance with density ranges of the recording media by using identical images formed by a plurality of exposure values, that is, an identical test pattern images, and provide images having stable gradation characteristic.

The invention of (12) takes the steps of selecting a plurality of images according to the information concerning the inputted recording medium type, forming latent images on the recording medium by a plurality of selected exposure values, developing to make visible images the recording medium, measuring the densities of the developed images, calculating a difference between the result of the density measurement and density values preset for a plurality of exposure values, creating values to modify the preset relationship between input image signals and exposure values according to the result of this differential result, and correcting the entered image signals by the created values for modification. Therefore, by this invention calibration can be conducted in accordance with density ranges of the recording media and images having stable gradation characteristic can be obtained.

According to an image forming apparatus of (13), calibrations can be carried out in accordance with the density ranges of recording media for mammography.

The above objects can be realized also by the invention having following features.

(21) An image forming apparatus having a recording medium loading section capable of loading two or more types of recording media of different density ranges and functioning to transport the recording media from the recording medium loading section, to form and record images on the recording media by exposure values corresponding to an input diagnostic image signal, wherein the image forming apparatus further comprising: an exposing device for forming latent images on the recording medium by a plurality of preset exposure values, a developing device for making latent images visible on the recording medium, a density measuring device for measuring the densities of the selected images, an identifying device for identifying the type of the recording medium by the result of the density measurement, a modifying device for calculating a difference between the result of the density measurement and density values preset for exposure values by which the developed images are formed according to the identified recording medium type and creating values to modify the preset relationship between input image signals and exposure values according to the result of this differential result, and a correcting device for correcting the exposure values corresponding to the input signals by modified values created by the modifying device.

(22) An image forming apparatus of (21), wherein the types of recording media contain recording media for mammography.

(23) An image forming method for an image forming apparatus having a recording medium loading section capable of loading two or more types of recording media of different density ranges and functioning to deliver the recording media from the recording medium loading section, to form and record images on the recording media by exposure values corresponding to an input diagnostic image signal, wherein the image forming method comprises the steps of: forming latent images on the recording medium by a plural of preset exposure values, making latent images visible on the recording medium, measuring the densities of the selected images, identifying the type of the recording medium by the result of the density measurement, calculating a difference between the result of the density measurement and density values preset for exposure values by which the developed images are formed according to the identified recording medium type, creating values to modify the preset relationship between input image signals and exposure values according to the result of this differential result, and correcting the exposure values corresponding to the input signals by modified values created by the modifying device.

The invention of (21) or (23) takes the steps of forming latent images on the recording medium by a plurality of preset exposure values, developing thereof, measuring the densities of the developed images, identifying the type of the recording medium, calculating a difference between the result of the density measurement and density values preset for exposure values by which the developed images are formed, creating values to modify the preset relationship between input image signals and exposure values according to the result of this differential result, and correcting the exposure values corresponding to the input image signals by the created values for modification. Therefore, independently of recording medium types, according to this invention calibrations in accordance with density ranges of the recording media are conducted by using identical images formed by a plurality of exposure values, that is, an identical test pattern images, and images having stable gradation characteristic can be obtained. Further, as this invention can identify the recording medium type by the result of the density measurement, no input device is required to enter information concerning recording media. This can simplify the apparatus.

According to an image forming apparatus of (22), calibrations can be carried out in accordance with the density ranges of recording media for mammography.

Embodiment 1

The first embodiment of this invention will be described in detail with reference to the accompanying drawings. This embodiment explains, as an example, an image forming apparatus that forms images by applying laser beam of input image signals to recording media such as photographic films.

Figure 1:
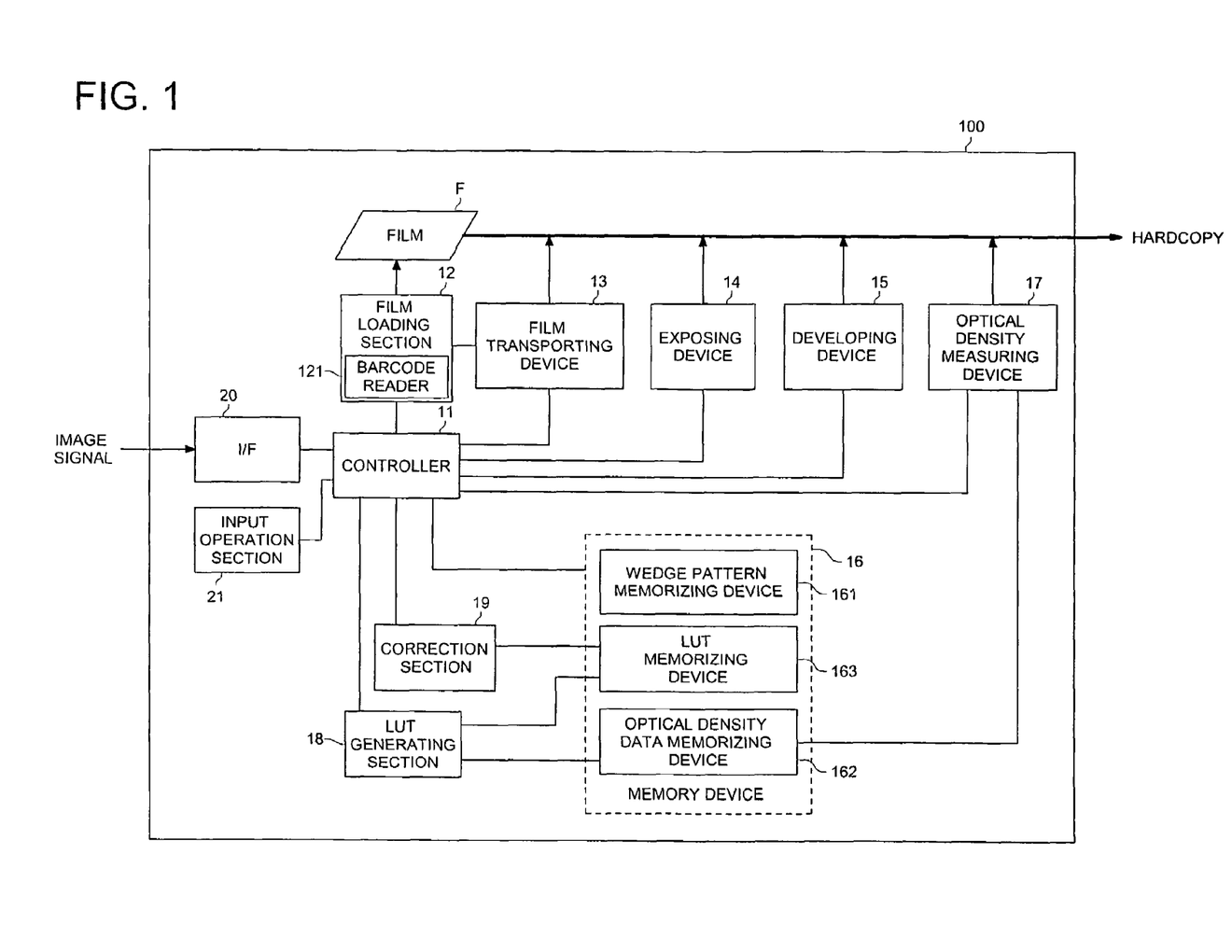
FIG. 1 shows a functional block diagram of the image forming apparatus 100 in accordance with this invention.

First, the configuration of the first embodiment will be explained. FIG. 1 shows a functional block diagram of the image forming apparatus 100 in accordance with this invention. Referring to FIG. 1, the image forming apparatus 100 is provided with a controller 11, a film loading section 12, a film transporting device 13, an exposing device 14, a developing device 15, a memory device 16, an optical density measuring device 17, an LUT generating section 1B, a correction section 19, an interface (I/F) 20, and an input operation section 21.

The controller 11 includes a central processing unit (CPU), a read-only memory (ROM), a random-access memory (RAM), etc. The controller 11 reads system program and processing programs from ROM, extracts the programs on RAM, and controls respective components of the image forming apparatus 100 by the extracted programs to perform various processes including calibration processing A to be explained later.

The film loading section 12 can load two or more types of film packages of different density ranges (mammography film type having maximum density Dmax of 4.0 and general medical and radiographic film type having Dmax of 3.0 in this example) and holds films F of the loaded film packages. In this embodiment, the film loading section 12 is equipped with a barcode reader 121 as an input device, reads a barcode containing film information and the like from a film package when it is loaded, and outputs the information to the controller 11. The film information contains information concerning at least the maximum density and type of the film.

The film transporting device 13 consists of film pickup and delivery rollers, etc. and takes up and delivers respective films F from the film loading section 12.

The exposing device 14 receives control signals from the controller 11, scans a film F with laser beams which are modulated by an input image signal to form a latent image on the film F.

The developing device 15 makes the latent image visible on the exposed film F.

The memory device 16 is made up of non-volatile semiconductor memory and contains a wedge pattern memorizing device 161, an optical density data memorizing device 162, and an LUT (Look-Up Table) memorizing device 163.

Figure 2:
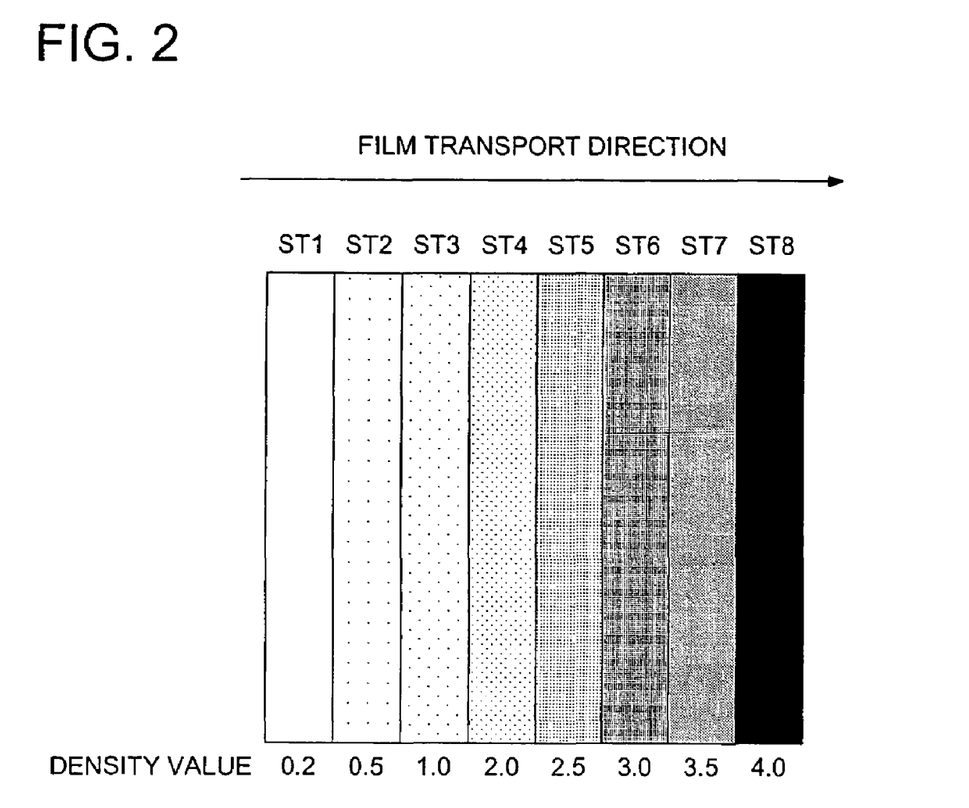
FIG. 2 shows an example of a wedge pattern image in accordance with the first embodiment of this invention.

The wedge pattern memorizing device 161 stores a plurality of laser exposure values to record a wedge pattern image (test pattern image) as shown in FIG. 2 on a film F. As shown in FIG. 2, a wedge pattern image arranges a plurality of graded density ranges (steps) of about same size but different densities with each other along the direction of movement of the film in the order of density level to form gradation pattern. The number of steps of the wedge pattern image is dependent upon the size of film F in the moving direction, the number of samplings required to read each step, and the film transport speed. The wedge pattern image in FIG. 2 contains eight density steps (ST1 to ST8) of density values of 0.2 to 4.0.

The optical density data memorizing device 162 stores optical density of each density step in a wedge pattern image measured by the optical density measuring device 17. The LUT memorizing device 163 stored a lookup table (LUT) created by the LUT generating section 18.

The optical density measuring device 17 including a light emitting device (not shown in the figure), a light receiving device (not shown in the figure), and an optical density calculating section (not shown in the figure), measures the transmission density of each step of the wedge pattern image recorded on the film F, calculates thereof, and outputs the result to the optical density data memorizing device 162. The light emitting device can be a light source such as a light emitting diode (LED) or a lamp. The light receiving device can be a light receptor such as a photo diode.

The LUT generating section 18 as a modifying device calculates a difference between the result of the optical density measurement of each step of the wedge pattern image stored in the optical density data memorizing device 162 and each density value which are properly expected for each density step of the wedge pattern image, creates a LUT as values to modify the preset relationship between input image signals and laser exposure values according to the result of this differential result, and stores the table in the LUT memorizing device 163.

The correction section 19 converts input image signals into laser exposure values by the LUT stored in the LUT memorizing device 163 and outputs the result to the controller 11.

The interface (I/F) 20 interconnects the image forming apparatus 100 with an external medical radiographic apparatus, a medical image reader, and a storage unit to input image signal from them. In this case, it is also possible to receive image signals through a network.

The input operation section 21 consists of functional buttons and a touch-sensitive panel covering the surface of a liquid crystal display (LCD), receives operation signals from them, and outputs them to the controller 11.

Figure 3:
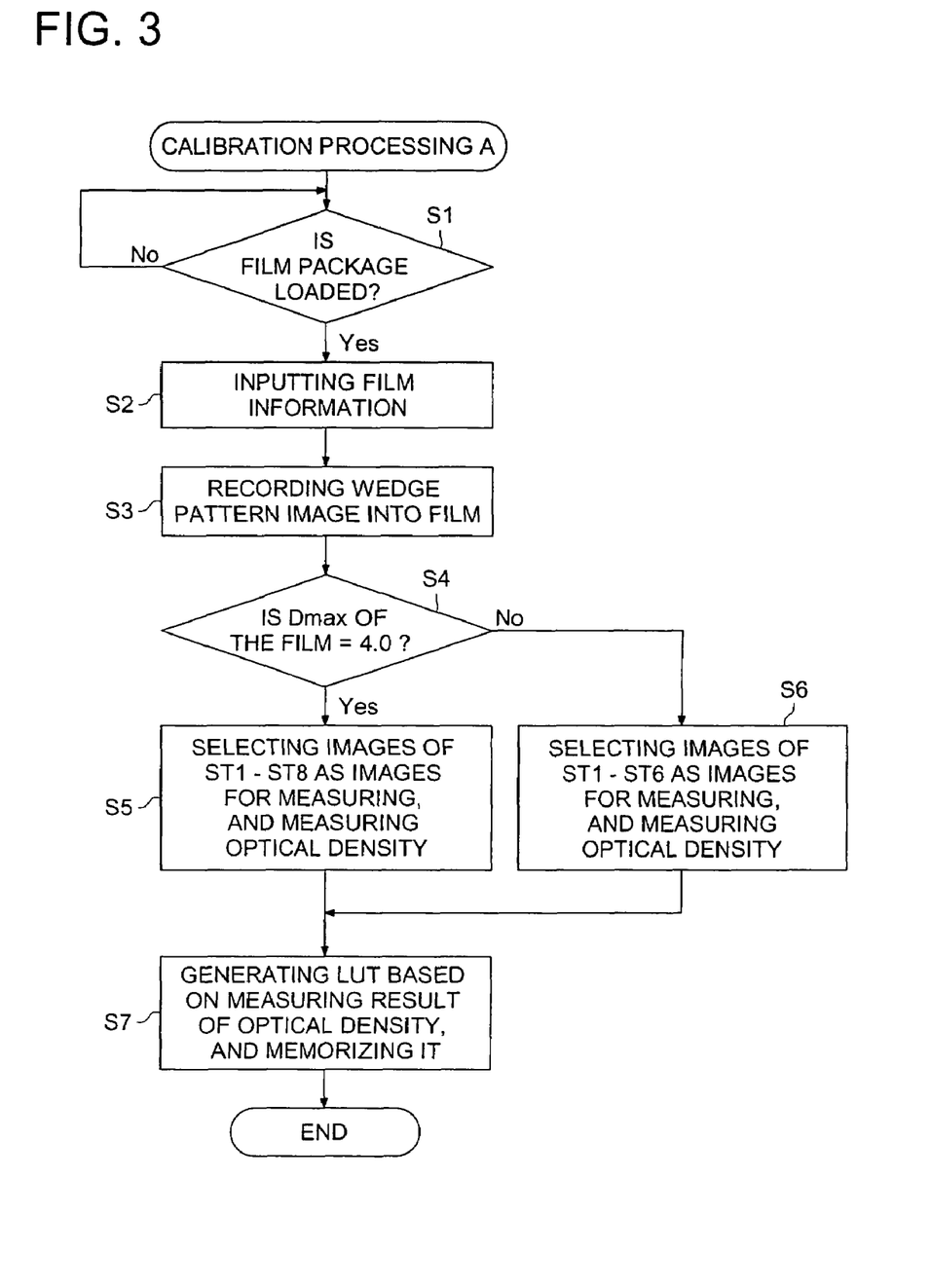
FIG. 3 shows a calibration processing A implemented by the controller 11 of FIG. 1.

Next, the operation of the first embodiment will be explained. FIG. 3 shows a calibration processing A implemented by the controller 11.

When a new film package is loaded in the film loading section 12 (Step S1), the barcode reader 121 reads a barcode on the film package and outputs information of a film in the loaded film package (Step S2). Then, the film transporting device 13 takes up one film F from the film package on the film loading section 12 and delivers it towards the exposing device 14. The exposing device 14 forms a latent image on the film F by laser light of exposure values stored in the wedge pattern memorizing device 161. The developing device 15 develops the latent image into a visible image (wedge pattern image) on the film F (Step 3).

Then, the controller checks whether the maximum density (Dmax) of the film F is 4.0 or not by the film information entered at Step S2. When the maximum density (Dmax) of the film is 4.0 (YES at Step S4), namely, when the film F is for mammography the optical density data measuring device 17 selects steps ST1 to ST8 of the wedge pattern image on the film F and measures their optical densities (Step S5). Then the LUT generating device 18 creates a lookup table (LUT) to modify a preset relationship between input image signals and laser exposure values according to the result of optical density measurement of the test image and stores the LUT on the LUT memorizing device 163 (Step S7).

When the maximum density (Dmax) of the film is not 4.0 (No at Step S4), or when the film F is not for mammography but for general medical radiography, the optical density data measuring device 17 selects steps ST1 to ST6 of the wedge pattern image on the film F and measures their optical densities (Step S6).

Then the LUT generating device 18 creates a lookup table (LUT) to modify a preset relationship between input image signals and laser exposure values according to the result of optical density measurement of the test image and stores the LUT on the LUT memorizing device 163 (Step S7).

When an input image signal entered through the I/F 20 is actually formed on the film F, the lookup table (LUT) stored in the LUT memorizing device 163 is used to correct the laser exposure values corresponding to the input signal by the correction section 19.

The above explanation assumes that the calibration processing A is implemented when an input image signal is formed on the film F, but the Steps S2 to S7 can be implemented periodically at a preset interval or by instructions sent from the input operation section 21 if necessary.

As explained above, the operation of the image forming apparatus 100 is summarized below. When a new film package is loaded in the film loading section 12, the barcode reader 121 inputs information of the film. The film transporting device 13 takes up one film F and the exposing device 14 forms a wedge pattern image on the film F by laser light of exposure values of steps stored in the wedge pattern memorizing device 161. The optical density data measuring device-judges the film type by the entered film information, selects image steps on the wedge pattern image for measurement according to the film type. The LUT generating device creates a lookup table (LUT) to modify a preset relationship between input image signals and laser exposure values according to the result of optical density measurement of the selected steps and stores the LUT on the LUT memorizing device 163.

Therefore, independently of film types, calibrations can be conducted in accordance with density ranges of the loaded film by an identical wedge pattern and provide images having stable gradation characteristic.

Embodiment 2

The second embodiment of this invention will be described below.

First, the configuration of the second embodiment will be explained.

The image forming apparatus in accordance with the second embodiment is basically the same as that of the first embodiment in major configuration. Only the differences between them will be explained below.

The controller 11 including a CPU, a ROM, a RAM, etc., reads system program and processing programs from ROM, extracts the programs on RAM, and controls respective components of the image forming apparatus 100 by the extracted programs to perform various processes including calibration processing B to be explained later.

Figures 4A, 4B:
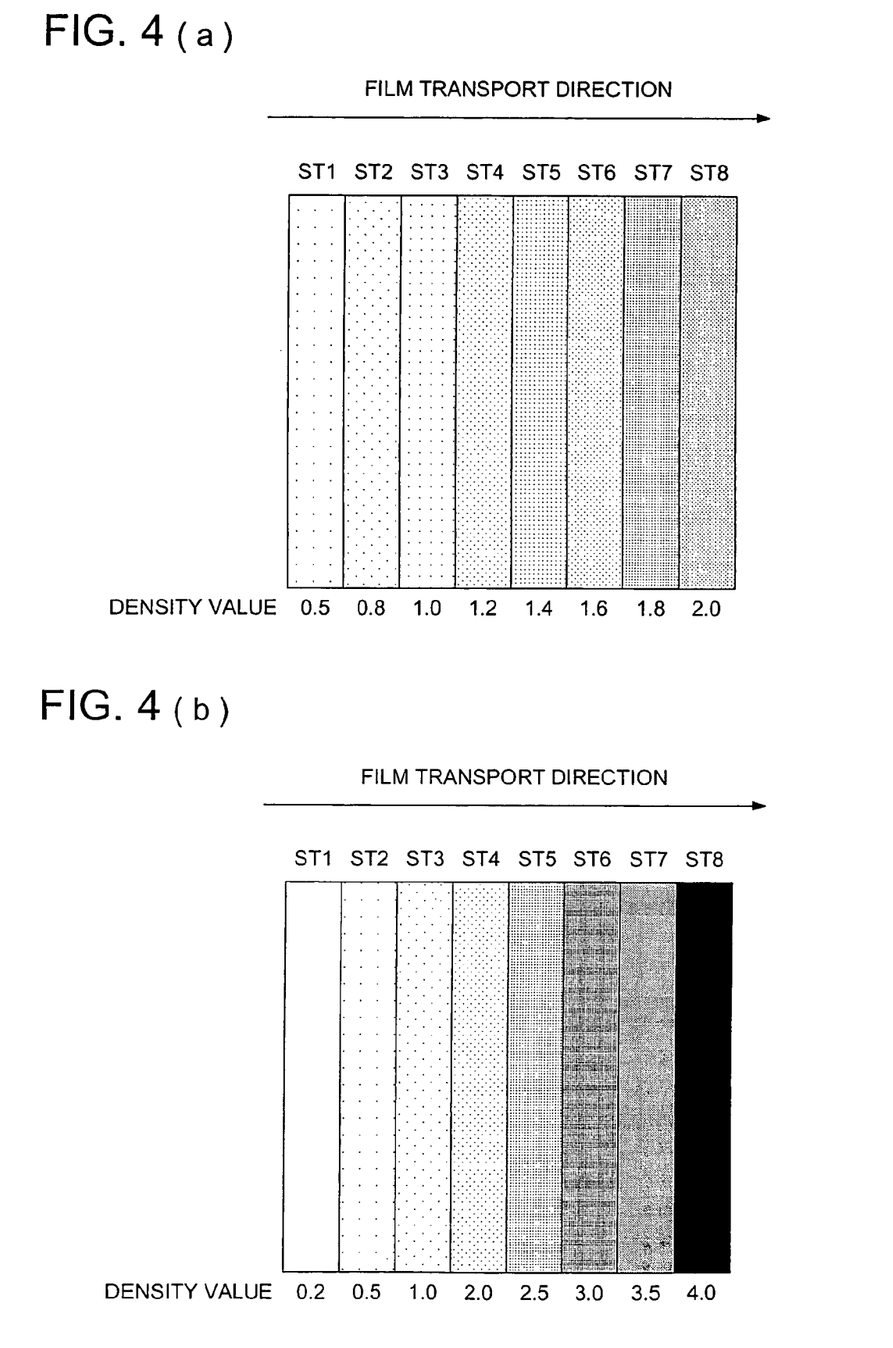
FIGS. 4(a)-4(b) show examples of first and second wedge patterns in accordance with the second embodiment of this invention.

The wedge pattern memorizing device 161 stores a combination of a plurality of laser exposure values (eight exposure values in this example) used to record the first wedge pattern image of FIG. 4(a) on a film F and a combination of a plurality of laser exposure values (eight exposure values in this example) used to record the second wedge pattern image of FIG. 4(b) on a film F. Each wedge pattern image arranges a plurality (eight for example) of graded density areas (steps) of approximately the same size but different densities along the movement of the film. The number of steps of the wedge pattern image is dependent upon the size of film F in the moving direction, the number of samplings required to read each step, and the film delivery speed.

The first wedge pattern image of FIG. 4(a) is used for calibration when the maximum density (Dmax) of the film is 3.0. The laser exposure values are determined so that the density values of ST1 to ST8 are in a density range, which is frequently used for diagnosis, for example 0.5 to 2.0.

The second wedge pattern image of FIG. 4(b) is used for calibration when the maximum density (Dmax) of the film is 4.0. The laser exposure values are determined so that the density values of ST1 to ST8 are in a density range, which is frequently used for diagnosis, for example 0.2 to 4.0.

Figure 5:
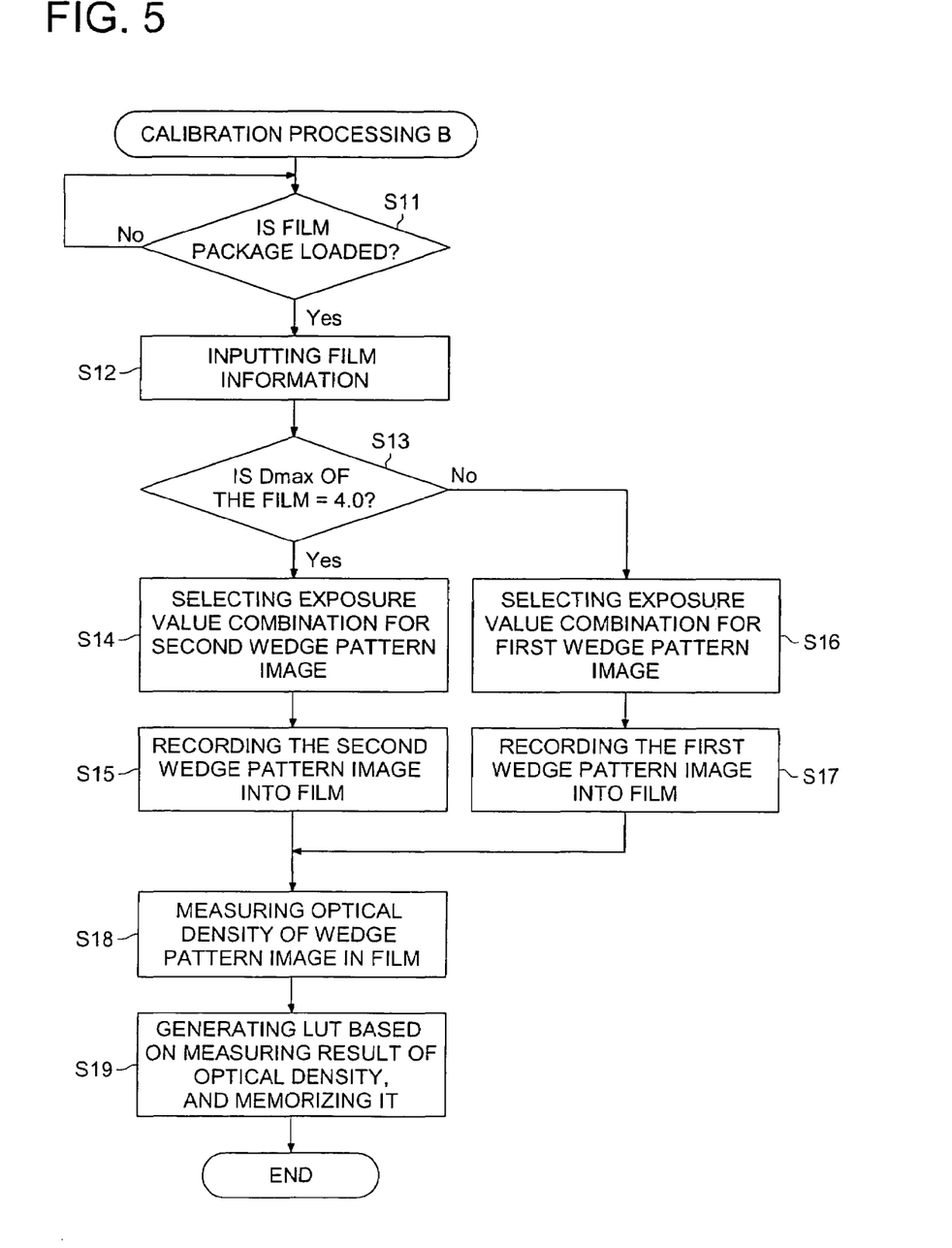
FIG. 5 shows a calibration processing B implemented by the controller 11 of FIG. 1.

By providing two kinds of exposure value combinations in the wedge pattern memorizing device 161, we can easily change the laser exposure values used for creation of a wedge pattern image in accordance with the density ranges of the film F in the calibration processing B to be explained later.

The configuration of the other components of the second embodiment is similar to that of the components of the first embodiment and their explanation is omitted here.

Next, we'll explain the operation of the second embodiment. FIG. 5 shows a calibration processing B implemented by the controller 11.

When a new film package is loaded in the film loading section 12 (Step S11), the barcode reader 121 reads a barcode on the film package and outputs information of a film in the loaded film package and film information of the loaded film package is inputted (Step S12), then whether the maximum density Dmax is 4.0 or not is judged (Step 13). As the result of the judgment, when the maximum density Dmax of the film is judged to be 4.0 (Step 13 YES), namely when it is judged to be mammography film, selected is the combination of laser exposure value for recording the second wedge pattern memorized in the wedge pattern memorizing device 161 (Step S14). The exposing device 14 exposes the selected combination of the exposure values to form a latent image on the film F transported by the transporting device from the film loading section, and the developing device visualizes the latent image to record the second wedge pattern image on the film F (Step S15).

On the other hand, when the maximum density Dmax of the film is not judged to be 4.0 (Step 13 NO), namely when it is not judged to be mammography film, selected is the combination of laser exposure value for recording the first wedge pattern memorized in the wedge pattern memorizing device 161 (Step S16). The exposing device 14 exposes the selected combination of the exposure values to form a latent image on the film F transported by the transporting device from the film loading section, and the developing device visualizes the latent image to record the second wedge pattern image on the film F (Step S17).

After the wedge pattern image is recorded on the film F, the optical density of this wedge pattern image is measured by the optical density measuring device 17 (Step S18), the LUT for correcting the predetermined relation between the input image signal and the laser exposure value is created by the LUT generating device base on the result of the optical density measurement, and the LUT is stored in the LUT memorizing device 163 (Step S19).

Actually, when forming the image of input image signal inputted via the I/F 20 on the film F, the LUT created by the above-mentioned calibration processing B and memorized in the LUT memorizing device 163 is utilized by the correcting device to correct the laser exposure value corresponding to the inputted image signal.

The above explanation assumes that the calibration processing A is implemented at the time of loading the film package, but the Steps S12 to S19 can be implemented periodically at a preset interval or by instructions sent from the input operation section 21 if necessary.

As described above, according to the image forming apparatus 100, when a new package film is loaded on the film loading section, based on the density range of the loaded film F, laser exposure value used for recording the wedge pattern image is selected. The exposing device 14 records the wedge pattern image with the selected laser exposure value, the optical density measuring device 17 measures the optical density of the wedge pattern image, based on the result of the optical density measurement the LUT generating section creates the LUT for correcting the predetermined relation between the input image signal and the laser exposure value, and the LUT is memorized in the LUT memorizing device.

Therefore, by changing the wedge pattern image according to the density range of the film F, the calibration based on the film density range can be conducted, to provide the image having stable gradation characteristic.

Incidentally, the description in the above first and second embodiments represent preferable examples of the image forming apparatus of the present invention, and the scope of the invention is not restricted to the embodiments."

For example, the above first and second embodiments use a barcode reader 121 to read film information from a barcode attached to a film package, but it is to be understood that the invention is not intended to be limited to the specific embodiments.

Variations may be made also on the detailed configuration and operation of the image forming apparatus 100 by one skilled in the art without departing from the spirit and scope of the invention.

Embodiment 3

The third embodiment of this invention will be described below.

For explanation, this embodiment takes an example of an image forming apparatus that forms an image on a recording medium such as a film by applying laser beam corresponding to an input image signal to the film. However, it is to be understood that the invention is not intended to be limited to this specific embodiment.

First, the configuration of the third embodiment will be explained. FIG. 1 shows a functional block diagram of the image forming apparatus 100 in accordance with this invention. Referring to FIG. 1, the image forming apparatus 100 includes a controller 11, a film loading section 12, a film transporting device 13, an exposing device 14, a developing device 15, a memory device 16, an optical density measuring device 17, an LUT generating section 18, a correction section 19, an interface (I/F) 20, and an input operation section 21.

The controller 11 including a central processing unit (CPU), a read-only memory (ROM), a random-access memory (RAM), etc., reads system and processing programs from ROM, extracts the programs on RAM, and controls respective components of the image forming apparatus 100 by the extracted programs to perform various processes including calibration processing to be explained later.

The film loading section 12 can load two or more film packages of different density ranges (mammography films having maximum density Dmax of 4.0 and general medical and radiographic films having Dmax of 4.0 in this example) and holds films F of the loaded film packages. This embodiment does not require a barcode reader 121.

The film transporting device 13 consists of film pickup and delivery rollers, etc. and takes up and delivers respective films F from the film loading section 12.

The exposing device 14 receives control signals from the controller 11, scans a film F with laser beams which are modulated by an input image signal to form a latent image on the film F.

The developing device 15 makes the latent image visible on the exposed film F.

The memory device 16 is made up of non-volatile semiconductor memory and includes a wedge pattern memorizing device 161, an optical density data memorizing device 162, and an LUT (Look-Up Table) memorizing device 163.

The wedge pattern memorizing device 161 stores a plurality of laser exposure values to record a wedge pattern image (test pattern image) as shown in FIG. 2 on a film F. As shown in FIG. 2, a wedge pattern image arranges a plurality of graded density ranges (steps) of approximately same size but different densities along the movement of the film. The number of steps of the wedge pattern image is dependent upon the size of film F in the moving direction, the number of samplings required to read each step, and the film delivery speed. The wedge pattern image contains eight density steps (ST1 to ST8) of density values of 0.2 to 4.0.

The optical density data memorizing device 162 stores optical density of each density step in a wedge pattern image measured by the optical density measuring device 17. The LUT memorizing device 163 stored a lookup table (LUT) created by the LUT generating section 18.

The optical density measuring device 17 consists of at least a light emitting device (not shown in the figure), a light receiving device (not shown in the figure), and an optical density calculating section (not shown in the figure), measures the transmission density of each step of the wedge pattern image recorded on the film F, calculates thereof, and outputs the result to the optical density data memorizing device 162. The light emitting device can be a light source such as a light emitting diode (LED) or a lamp. The light receiving device can be a light receptor such as a photo diode.

The LUT generating section 18 as a modifying device calculates a difference between the result of the optical density measurement of each step of the wedge pattern image stored in the optical density data memorizing device 162 and density values preset for exposure values which are properly expected for each density step of the wedge pattern image, creates a LUT as values to modify the preset relationship between input image signals and laser exposure values according to the result of this differential result, and stores the table in the LUT memorizing device 163.

The correction section 19 corrects the laser exposure values corresponding to input image signals by the LUT stored in the LUT memorizing device 163, converts input image signals into laser exposure values and outputs the result to the controller 11.

The interface (I/F) 20 interconnects the image forming apparatus 100 with an external medical radiographic apparatus, a medical image reader, and a storage unit to input image signal from them. In this case, it is also possible to receive image signals through a network.

The input operation section 21 consists of functional buttons and a touch-sensitive panel covering the surface of a liquid crystal display (LCD), receives operation signals from them, and outputs them to the controller 11.

Figure 6:
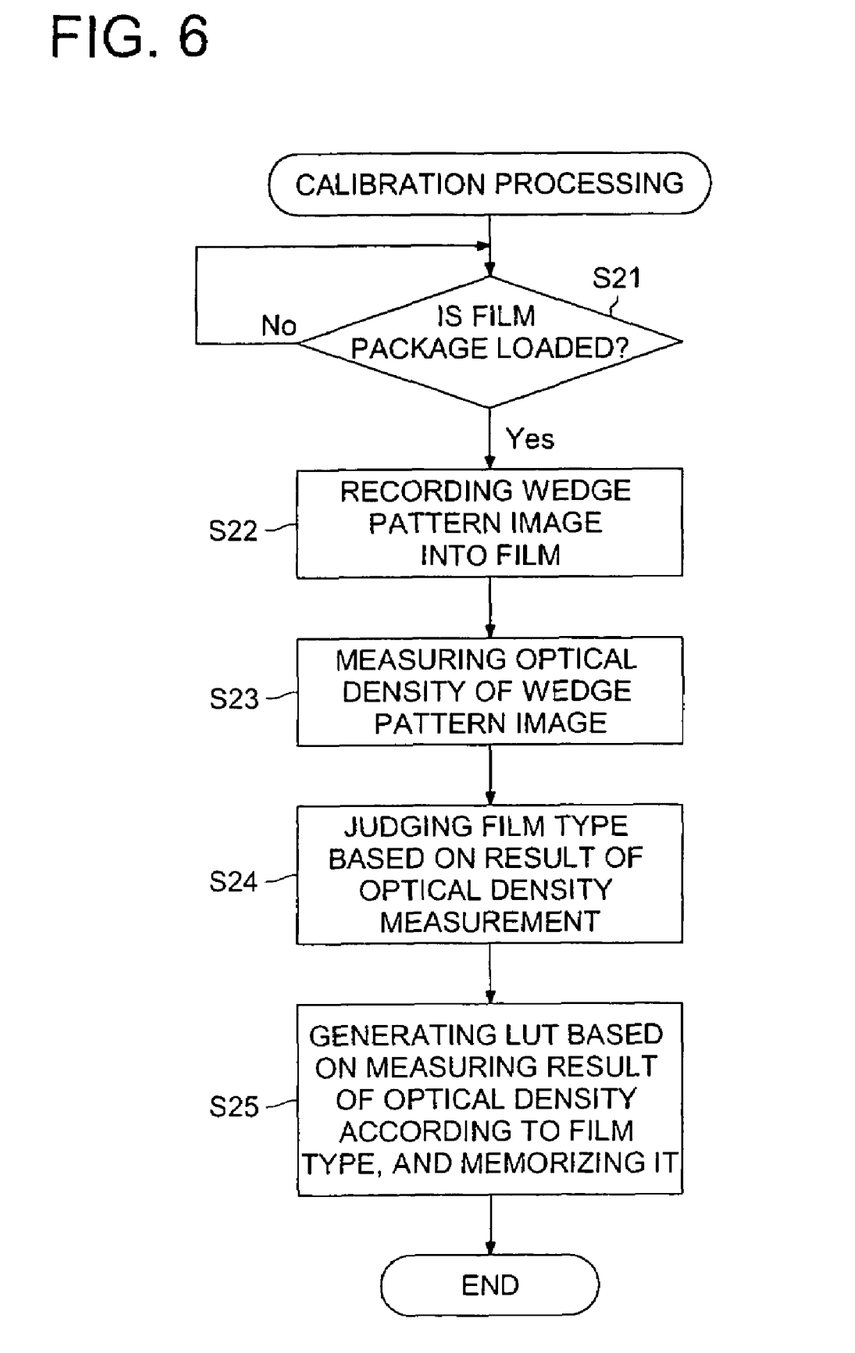
FIG. 6 shows a calibration processing C implemented by the controller 11 of FIG. 1.

Next, the operation of the third embodiment will be explained. FIG. 6 shows a calibration processing C implemented by the controller 11.

When a new film package is loaded in the film loading section 12 (Step S21), the film transporting device 13 delivers one film F from the film package to the exposing device 14. The exposing device 14 forms a latent image on the film F by laser light of exposure values stored in the wedge pattern memorizing device 161. The developing device 15 develops the latent image into a visible image (wedge pattern image) on the film F (Step 22).

Then, the optical density data measuring device 17 measures the optical densities of the wedge pattern image recorded on the film F (Step S23) and identifies the type (film type) of the film F by the result of this measurement (Step 24). In other words, when the maximum density (Dmax) of the film is 3.0 (for general medical radiography), the density values of ST7 and ST8 of FIG. 2 are similar to the density value of ST6. When the maximum density (Dmax) of the film is 4.0 (for mammography), the density values of ST6, ST7 and ST8 are different from each other. This enables discrimination of the film type (general medical radiographic film or mammography film) by the result of measurement of optical densities. Then the LUT generating device 18 creates a lookup table (LUT) for determining a relationship between input image signals and laser exposure values according to the density ranges of the film type identified by the result of optical density measurement (Dmax), and stores the LUT on the LUT memorizing device 163 (Step S25).

When a medical image information is actually formed on the film F, the correction section 19 corrects the laser exposure values corresponding to the input signal by using the lookup table (LUT) that is created by the above calibration processing and stored in the LUT memorizing device 163.

The above explanation assumes that the calibration processing A is implemented when an input image signal is formed on the film F, but the Steps S22 to S25 can be implemented periodically at a preset interval or by instructions sent from the input operation section 21 if necessary.

As explained above, the operation of the image forming apparatus 1 is summarized below. When a new film package is loaded in the film loading section 12, the film transporting device 13 delivers one film F from the film package to the exposing device 14. The exposing device 14 forms a wedge pattern image on the film F by laser light of exposure values stored in the wedge pattern memorizing device 161. The optical density measuring device 17 measures the wedge pattern image and identifies the film type by the result of measurement of optical densities, especially by Dmax. The LUT generating device 18 creates a lookup table (LUT) to modify a preset relationship between input image signals and laser exposure values according to the density ranges of the identified film type.

Therefore, independently of film types, this invention can calibrate in accordance with density ranges of the loaded film by an identical wedge pattern and provide images having stable gradation characteristic. Further, as this invention can identify the recording medium type by the result of the optical density measurement, no input device is required to enter film information. This can simplify the apparatus.

The descriptions of the above embodiments are preferred embodiments of the image forming apparatus 100 in accordance with this invention and are not to be construed to limit the scope of this invention.

Variations may be made also on the detailed configuration and operation of the image forming apparatus 100 by one skilled in the art without departing from the spirit and scope of the invention.

What is claimed is:

1. An image forming apparatus for forming and recording an image on a recording medium according to an exposure value corresponding to an inputted diagnostic image signal, the image forming apparatus comprising:
   a recording medium loading section capable of loading plural types of recording media, each type of recording media having a different density range from the other;
   an exposing device for forming latent images on the recording medium by exposing the recording medium with predetermined plural test exposure values;
   a developing device for visualizing the latent images to form developed images on the recording medium;
   a density measuring device for measuring densities of the developed images corresponding to the predetermined plural test exposure values;
   a memory device for storing predetermined density values correlated to the predetermined plural test exposure values;
   a selecting device for selecting a predetermined number of images among the developed images corresponding to the predetermined plural test exposure values; and
   a calibration section for creating LUT that determines a relationship between input image signals and exposure values, based on measured densities of the selected predetermined number of images and stored predetermined density values correlated to the predetermined plural test exposure values.

2. The image forming apparatus of claim 1, further comprising an input device for inputting information regarding a type of recording medium, wherein the selecting device selects the predetermined number of images based on the information inputted by the input device.

3. The image forming apparatus of claim 1, wherein the selecting device identifies a type of the recording medium based on a result of measured densities, and selects the predetermined number of images among the developed images corresponding to the identified type of the recording medium.

4. The image forming apparatus of claim 3, wherein the selecting device identifies the type of recording medium by a Dmax value of the measured densities.

5. An image forming method for forming and recording an image on a recording medium according to an exposure value corresponding to an inputted diagnostic image signal, the image forming method comprising the steps of:

loading at least one of plural types of recording media, each type of recording media having a different density range from the other;

exposing the recording medium with predetermined plural test exposure values to form latent images on the recording medium;

developing the latent images to form developed images on the recording medium;

measuring densities of the developed images corresponding to the predetermined plural test exposure values;

storing predetermined density values correlated to the predetermined plural test exposure values;

selecting a predetermined number of images among the developed images corresponding to the predetermined plural test exposure values; and creating a LUT that determines a relationship between input image signals and exposure values, based on measured densities of the selected predetermined number of images and stored predetermined density values correlated to the predetermined plural test exposure values.

* * * * *